(12) United States Patent
Grisin et al.

(10) Patent No.: US 8,061,401 B2
(45) Date of Patent: Nov. 22, 2011

(54) TIRE BEAD STRUCTURE

(75) Inventors: Bopha Grisin, Mozac (FR); Phillppe Johnson, Perignat sur Allier (FR); Olivier Lenepveu, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 238 days.

(21) Appl. No.: 12/526,039

(22) PCT Filed: Jan. 30, 2008

(86) PCT No.: PCT/EP2008/051095
§ 371 (c)(1),
(2), (4) Date: Sep. 25, 2009

(87) PCT Pub. No.: WO2008/107234
PCT Pub. Date: Sep. 12, 2008

(65) Prior Publication Data
US 2010/0006201 A1    Jan. 14, 2010

(30) Foreign Application Priority Data
Feb. 12, 2007 (FR) ..................... 07 01047

(51) Int. Cl.
*B60C 15/06* (2006.01)
(52) U.S. Cl. ................ 152/542; 152/540; 152/546
(58) Field of Classification Search ........... 152/539, 152/540, 541, 542, 543, 544, 545, 546, 547
See application file for complete search history.

(56) References Cited

U.S. PATENT DOCUMENTS

| 1,393,952 | A | 10/1921 | Miller | |
| 6,460,589 | B1 * | 10/2002 | Auxerre | 152/540 |
| 6,823,914 | B2 * | 11/2004 | Miyazono | 152/543 |
| 7,819,157 | B2 * | 10/2010 | Ferlin et al. | 152/543 |
| 2004/0194864 | A1 * | 10/2004 | Saeki | 152/539 |

FOREIGN PATENT DOCUMENTS

| EP | 0 287 497 | 10/1988 |
| FR | 2 882 691 | 9/2006 |

* cited by examiner

*Primary Examiner* — Philip Tucker
*Assistant Examiner* — Vishal I Patel
(74) *Attorney, Agent, or Firm* — Cozen O'Connor

(57) ABSTRACT

Heavy goods vehicle tire comprising a radial carcass reinforcement (10) anchored in each of the beads to an anchoring structure (20), this carcass reinforcement (10) being partially wound around an anchoring structure (20), passing from the inside of the tire towards the outside, a first connecting reinforcement (30) partially in contact with the carcass reinforcement (10) and wound around the anchoring structure (20), a second connecting reinforcement (40) formed of a plurality of reinforcing members directed in a mean direction that makes an angle of 50 degrees at most with the circumferential direction and envelopes the first connecting reinforcement (30) to form an internal portion (41) and an external portion (42), the internal portion (41) being in contact over a length V1 with the carcass reinforcement between a first end point D1 of the said first portion and the end point P1 of the first connecting reinforcement (30), the external portion (42) being in contact with the carcass reinforcement from a point D20 as far as an end point D2 of the external portion over a length V2, the points D1 and D2 being situated radially beyond the end points P1, P2 of the first connecting reinforcement (30).

12 Claims, 2 Drawing Sheets

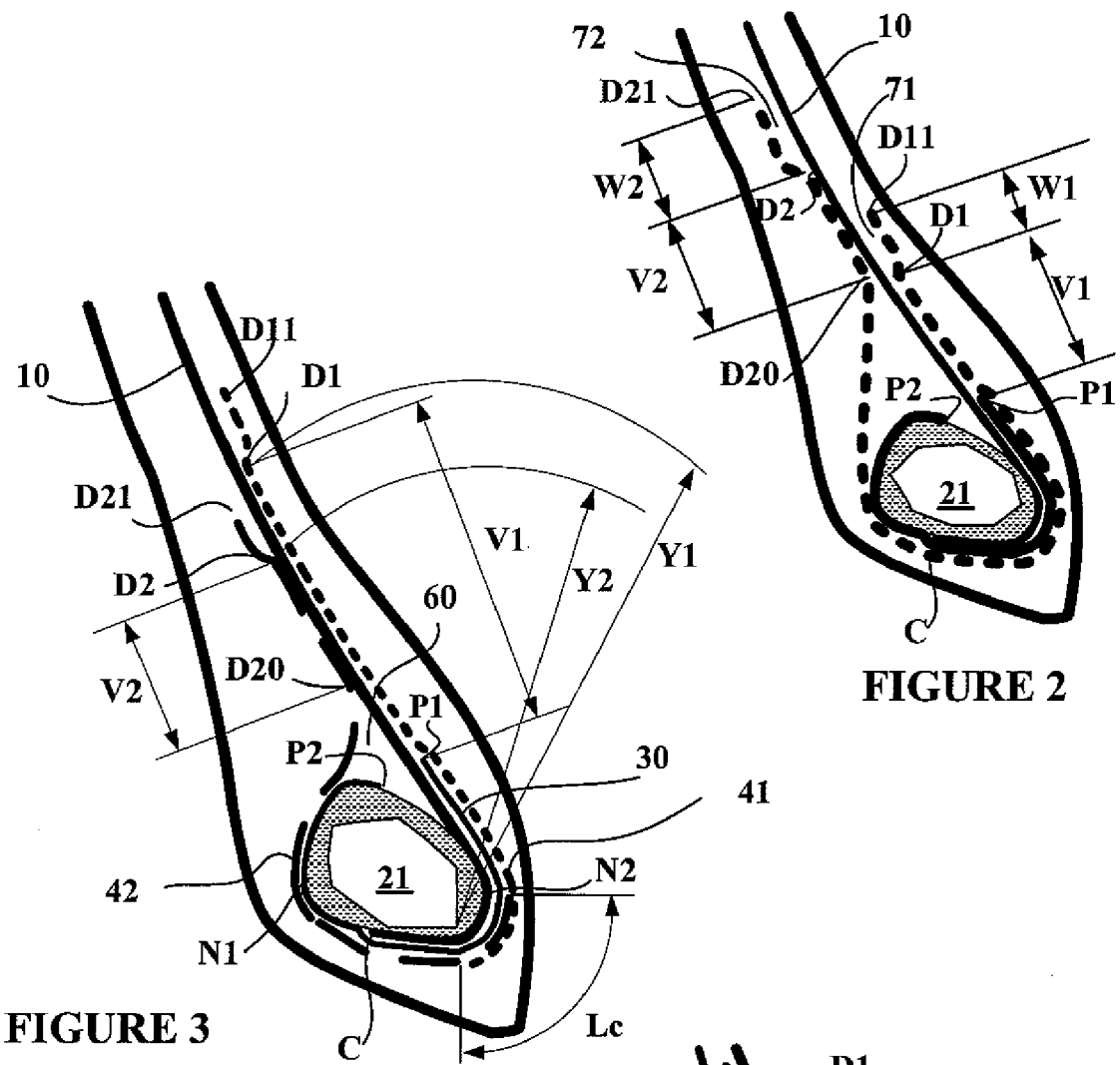
FIGURE 2
FIGURE 3
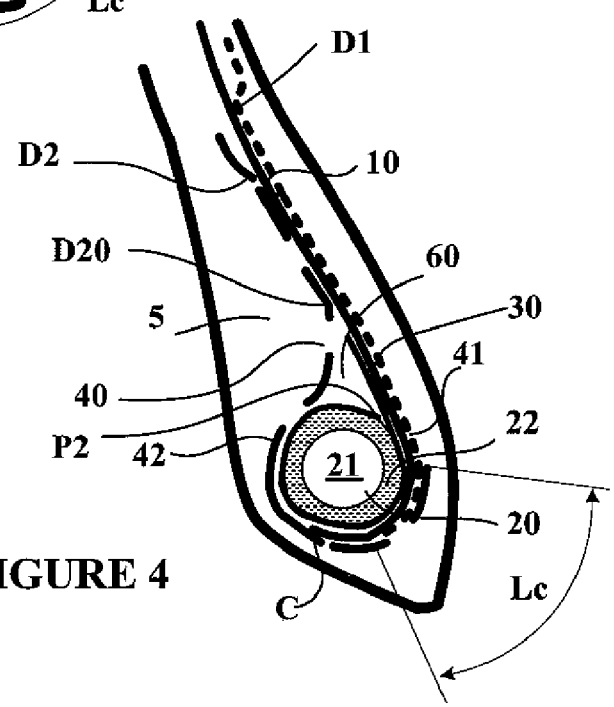
FIGURE 4

TIRE BEAD STRUCTURE

RELATED APPLICATIONS

This is a U.S. national stage under 35 USC §371 of application No. PCT/EP2008/051095, filed on Sep. 12, 2008.

This application claims the priority of French application no. 07/01047 filed Feb.12, 2007, the content of which is hereby incorporated by reference.

FIELD OF THE INVENTION

The invention relates to radial tires intended to be fitted to heavy goods vehicles and, more specifically, relates to the bead structure of these tires.

BACKGROUND OF THE INVENTION

A heavy goods vehicle tire comprises a crown part surmounted radially on the outside by a tread intended to come into contact with the roadway, this crown part being extended on each side by sidewalls ending in beads. A tire comprises a plurality of reinforcement armatures including, in particular, a carcass reinforcement the purpose of which is to withstand the loads created by the tire internal inflation pressure. This carcass reinforcement extends into the crown, the sidewalls of the tire and is anchored at its ends to appropriate anchoring structures located in the beads. The carcass reinforcement is generally made up of a plurality of reinforcing members arranged parallel to one another and making an angle of or in the region of 90 degrees with the circumferential direction (in which case, the carcass reinforcement is said to be "radial"). The carcass reinforcement is usually anchored by turning it up around an anchoring structure of appropriate circumferential rigidity in order axially on the outside to form a turned-up portion of which the length, measured for example with respect to the radially innermost point of the anchoring structure, is chosen to provide the tire with satisfactory durability during use. Axially between the turned-up portion and the carcass reinforcement there are one or more elastomer-based materials which provide a mechanical coupling between the two parts of the carcass reinforcement.

In use, this tire is mounted on a mounting rim comprising rim seats intended to be in contact with the radially innermost parts of the beads and, axially on the outside of each seat, a rim flange intended to fix the axial position of the said bead when the tire is fitted and inflated to its nominal pressure.

In order to withstand the mechanical stresses of running, it is known practice to provide additional reinforcements that reinforce the bead, in the form in particular of plies arranged against at least a part of the turned-up portion of the carcass reinforcement.

During running, the tire beads are subjected to a great many bending cycles, thereby winding themselves around the rim flanges (that is to say partially adopting the geometry of the said flanges). This bending results in greater or lesser variants in curvature combined with variations in tension in the reinforcement armatures that reinforce the beads and, in particular, in the turned-up portion of the carcass reinforcement and in the said reinforcement. These same cycles induce compressive and extensile loadings in the materials of which the beads are made. Under running conditions, it is also found that the reinforcing members of the reinforcement of the carcass ply shift circumferentially and cyclically in the sidewalls and the beads of the tire. A cyclic circumferential shift is to be understood here to mean that the shift is in one direction and in the opposite direction each time the wheel revolves about a mean position of equilibrium.

Running generates within the materials of which the bead is made, and in particular within the elastomeric materials and most especially in those situated in the immediate vicinity of the ends of the reinforcements (the end of the turned-up portion of the carcass reinforcement or the ends of the additional reinforcements) stresses and/or deformations which may lead to a more or less appreciable reduction in the service life of the tire.

This is because these stresses and/or deformations may cause delamination and cracking near the ends of the said reinforcements. Because of the radial direction of the reinforcing members and because of the nature of the said reinforcing members (these are generally metal cables) of which it is made, the turned-up end of the carcass reinforcement is particularly sensitive to this phenomenon.

The document published under the reference WO 2006/013201-A1 describes a tire bead structure in which the carcass reinforcement has been not turned up by being wound partially over a bead wire but wound around an anchoring structure over at least one full turn in each of the beads. In this way, the end of the carcass reinforcement lies in a region of the bead which is not subjected to high cyclic stresses; it is thus possible to improve the endurance of the beads.

However, while such a tire bead structure is effective from a mechanical standpoint, it is nonetheless still expensive and tricky to implement using conventional industrial scale and manufacturing means.

SUMMARY OF THE INVENTION

One object of the present invention is to prevent the risk of bead degradation by providing a bead structure of sufficient rigidity to withstand the bending forces and circumferential movements of the reinforcements during running while at the same time being easy to implement.

Another object is to provide such a bead structure that performs well with respect to the abovementioned stresses while the tire is running along, while at the same time being relatively easy and economically attractive to produce on an industrial scale.

These and other objects are attained in accordance with one aspect of the present invention directed to a heavy goods vehicle tire comprising a tread extended transversely on each side by sidewalls ending in beads intended to collaborate with a mounting rim. This tire further comprises a radial carcass reinforcement comprising a plurality of reinforcing members directed in a direction that makes an angle of at least 80 degrees with the circumferential direction.

This carcass reinforcement is anchored in each of the beads to an anchoring structure comprising a circumferential reinforcement armature around which is formed a coating profile of which the contour of the meridian section comprises a part radially on the inside and a part radially on the outside, these two parts meeting at two points axially furthest from the contour of the said coating profile.

Furthermore, this carcass reinforcement is partially wound around the coating profile of the anchoring structure passing from the inside of the tire towards the outside, the end of this carcass reinforcement being located on or near the contour of the coating profile.

This tire additionally comprises a first connecting reinforcement, formed of a plurality of reinforcing members directed in a direction that makes an angle of 70 degrees or more with the circumferential direction. This first connecting reinforcement comprises a first part in contact with the carcass reinforcement between a point P1 radially on the outside of the point of the contour of the coating profile of the radially outermost anchoring structure and the end point of the carcass reinforcement, this first connecting reinforcement being extended beyond the end of the carcass reinforcement by a second part in contact with the coating profile as far as a point P2 situated on the radially outside part of the contour of the coating profile.

This tire also comprises a second connecting reinforcement enveloping the first connecting reinforcement and passing radially under the coating profile radially on the inside of the said first connecting reinforcement so as to form an internal portion and an external portion, the internal portion being axially on the inside of the carcass reinforcement and the external portion being axially on the outside of the said carcass reinforcement; the internal portion is in contact over a length V1 with the carcass reinforcement between a first end point D1 of the said first portion and the end point P1 of the first connecting reinforcement, the external portion being in contact with the carcass reinforcement from a point D20 as far as an end point D2 of the external portion over a length V2, the points D1 and D2 being situated radially beyond the end points P1, P2, of the first connecting reinforcement.

This second connecting reinforcement is formed of a plurality of reinforcing members directed in a mean direction that makes an angle of 50 degrees at most with the circumferential direction.

The novelty of the proposed solution lies, inter alia, in the fact that the second connecting reinforcement is anchored around the bead anchoring structure while at the same time being coupled to the carcass reinforcement axially on each side of this reinforcement, in combination with the end of the carcass reinforcement being positioned near the anchoring structure. In a structure such as this, the end of the carcass reinforcement is kept in a region subjected to fairly low amounts of stress and deformation under running conditions and this end is also covered by at least the second reinforcement.

Advantageously, and viewed in meridian section, the distance Y2 separating the radially outermost end of the external portion of the second connecting reinforcement from the point A of the reinforcing structure of the circumferential reinforcement armature that is radially innermost is equal to at least 20 percent and at most 60 percent of the radial distance between the radially outermost point on the carcass reinforcement and the radially innermost point on the same carcass reinforcement.

Likewise, it is advantageous for the distance Y1 separating the radially outermost end of the first portion of the second connecting reinforcement from the point of the reinforcing structure of the anchoring structure that is radially innermost to be equal to at least 15 percent and at most 40 percent of the radial distance between the radially outermost point on the carcass reinforcement and the radially innermost point on the same carcass reinforcement.

As a preference, the contact length of the first portion of the second connecting reinforcement is equal to at least 20 percent of the distance separating the radially outermost end of the internal portion of the second connecting reinforcement from the point of the circumferential reinforcement armature of the anchoring structure that is radially innermost.

Advantageously too, the contact length of the external portion of the second connecting reinforcement is at least equal to 15 percent of the distance separating the radially outermost end of the external portion of the second connecting reinforcement from the point of the circumferential reinforcement armature of the anchoring structure that is radially innermost.

BRIEF DESCRIPTION OF THE DRAWINGS

Further features and advantages of the invention will become apparent from the description given hereinafter with reference to the attached drawings which, by way of nonlimiting examples, show some embodiments of the subject matter of the invention.

FIG. 2 shows another alternative form of a tire according to the invention, in which the second connecting reinforcement is decoupled from the carcass reinforcement at its two ends;

FIG. 3 shows another alternative form in which the second connecting reinforcement is formed of two parts which are locally superposed;

FIG. 4 shows another alternative form in which the first connecting reinforcement is positioned between the bead anchoring structure and the carcass reinforcement.

DETAILED OF THE DRAWINGS

Figure 1:
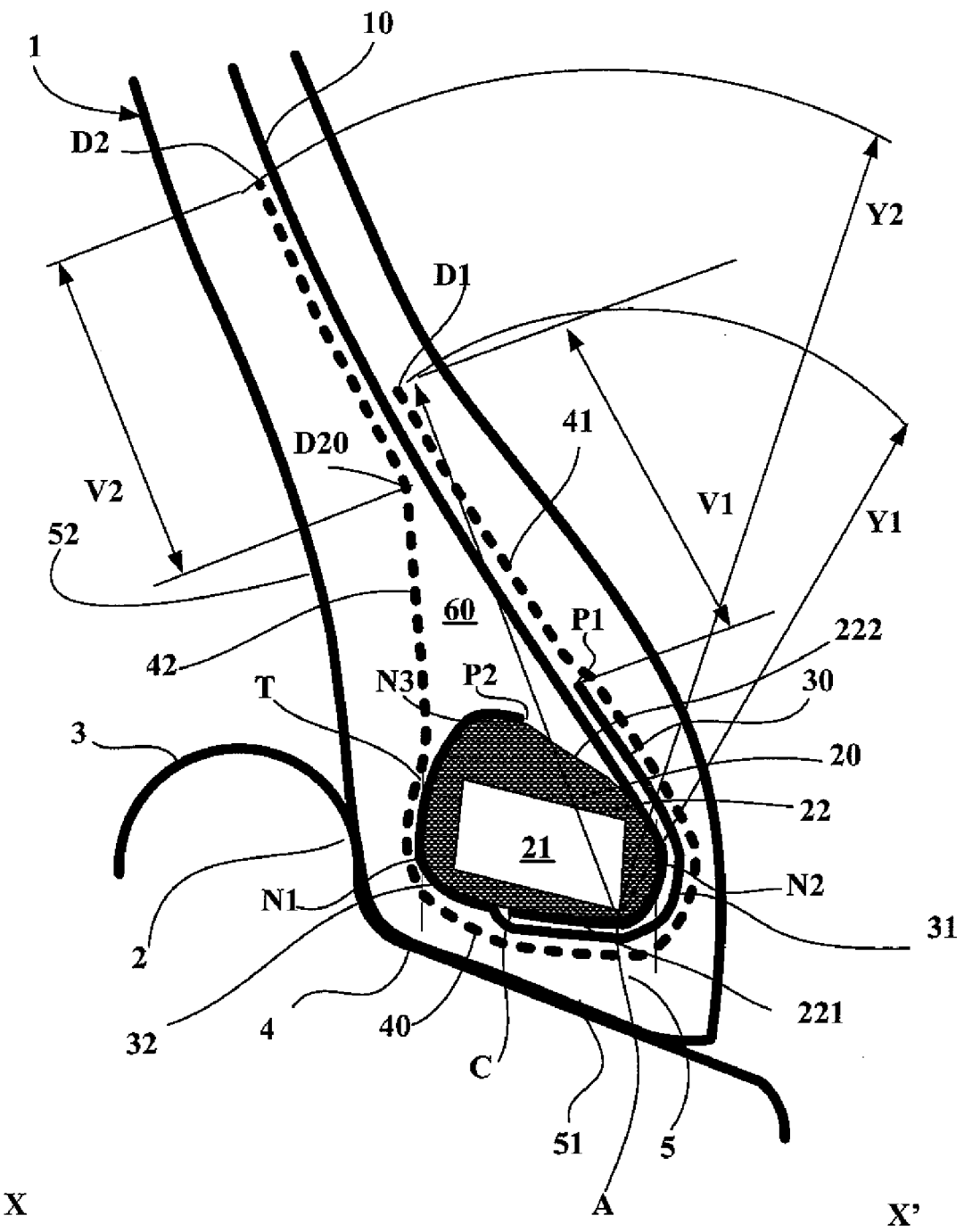
FIG. 1 shows a cross section through a tire according to the invention.

Definitions:

"Radially" means a direction perpendicular to the axis of rotation.

"Radially towards/on the outside" indicates a direction perpendicular to the axis of rotation and moving away from the said axis of rotation.

"Radially towards/on the inside": means a direction perpendicular to the axis of rotation and moving towards the said axis of rotation.

"Axially towards/on the inside": means a direction parallel to the axis of rotation and directed towards the inside of the cavity in which the tire inflation pressure is applied.

"Inside of the tire" denotes the inside of the tire cavity in which the inflation pressure is applied.

"Meridian section or meridian plane of section" corresponds to a cross section through the tire such that the plane of section contains the axis of rotation of the tire.

Reinforcing members are said to be "directed radially" when they are contained chiefly in a meridian plane of section. By extension, reinforcing members making an angle of at least 80 degrees are also said to be radial here.

To make the description of the alternative forms shown with the figures easier to understand, the same references are used to denote elements of identical structure.

FIG. 1 shows a bead 5 of a tire 1 of a size 295/60R22.5, this tire being mounted on a mounting rim 2 of which it is possible to see a bead seat 4 extended axially outwards by a hook 3. The bead 5 of this tire 1 comprises a seat part 51 intended to be in contact with the seat 4 of the rim 2, this seat part being extended axially outwards by an external part 52. The hook 3 axially limits the extent to which the bead 5 can shift when the tire is inflated. Under running conditions, the external part 52 of the bead winds itself around the hook 3 to a greater or lesser extent. The axis XX' is an axis parallel to the axis of rotation of the tire.

The tire 1 according to the invention is reinforced by a radial carcass reinforcement 10 consisting of a plurality of metal cords formed of several elemental wires measuring 18/100 mm. These cords are embedded in an elastomeric compound and are directed substantially in a radial direction. In this FIG. 1, it can be seen that the carcass reinforcement 10 is anchored at one of its ends around an anchoring structure 20 in a bead 5, this anchoring structure comprising a coating profile 22 coating a circumferential reinforcement armature 21 (in this instance, the reinforcing structure is a bead wire made up of a plurality of circumferentially wound metal wires). The carcass reinforcement follows the meridian profile of part of the contour of the coating profile 22 and is mechanically coupled to this coating profile by adhesion of the material of which the coating profile is made to the material with which the reinforcing members of the carcass reinforcement are coated.

Viewed in a meridian plane of section (that is to say in a plane of section containing the axis of rotation of the tire), the coating profile 22 has a contour comprising a radially inner part 221 and a radially outer part 222, the said parts meeting at the points N1, N2 axially remotest from the contour of the said coating profile.

Axially towards the inside of the carcass reinforcement 10, a first connecting reinforcement 30, formed of a plurality of reinforcing members directed in a direction that makes an angle of 70 degrees or more with the circumferential direction, comprises a first part 31 in contact with the carcass reinforcement 10 between a point P1 radially on the outside of the point N3 of the contour of the coating profile 22 that is radially outermost and the end point C of the carcass reinforcement, this first connecting reinforcement 30 being extended beyond the end point C of the carcass reinforcement by a second part 32 in contact with the coating profile 22 as far as a point P2 situated on the radially outer part 222 of the contour of the coating profile 22.

This tire further comprises a second connecting reinforcement 40 enveloping the first connecting reinforcement 30, this second reinforcement passing radially on the inside of the coating profile 22 and radially on the inside of the first connecting reinforcement 30 to form an internal portion 41 and an external portion 42, the internal portion 41 being situated axially on the inside of the carcass reinforcement 10 and the external portion 42 being situated axially on the outside of the carcass reinforcement 10.

The internal portion 41 of the second connecting reinforcement 40 is in contact over a length V1 with the carcass reinforcement between a first end point D1 of the said internal portion 41 and the end point P1 of the first connecting reinforcement 30, the external portion 42 being in contact with the carcass reinforcement from a point D20 as far as an end point D2 of the external portion 42 over a length V2. The points D1 and D2 are situated radially beyond the end points P1, P2 of the first connecting reinforcement 30.

The second connecting reinforcement 40 is formed of a plurality of reinforcing members (in this instance metal cables based on individual wires measuring 0.35 mm in diameter) coated in an elastomer-based composition, these reinforcing members being directed in a mean direction that makes an angle of at most 50 degrees with the circumferential direction and more preferably still an angle of at least 20 degrees and at most 30 degrees (in this instance: 30°). Choosing values such as this for this angle also has the effect of making manufacture, and particularly the turning-up around the anchoring structure, easier.

As a preference, the reinforcing members in the first and second connecting reinforcements are identical and may be chosen from reinforcing members of a textile or metallic nature (for example: aramide reinforcing members measuring 167×3).

The end C of the carcass reinforcement is situated radially inside the inner part 221 of the coating profile 22 of the anchoring structure and axially between the axially remotest points N1, N2 of the contour of the said coating profile.

For the tire described, the values are as follows: Y1=50 mm; Y2=63 mm; V1=16 mm; V2=12 mm.

Furthermore, a profile 60 made of a rubber compound is inserted between the carcass reinforcement and the second portion of the second connecting reinforcement 40 in order to fill the volume defined by the carcass reinforcement and the external portion 42 of the second reinforcement 40 radially on the outside of the anchoring structure 20 and as far as the point D20 where this external portion is coupled to the carcass reinforcement. The material of this profile 60 is chosen such that it has an elastic modulus of between 2 and 5 MPa (in this instance 4 MPa) at 10% elongation.

The distance Y2 separating the radially outermost end of the external portion 42 of the second connecting reinforcement 40 from the point A of the reinforcing structure of the circumferential reinforcement armature (21) that is radially innermost is equal to 63 mm, namely 45% of the radial distance between the radially outermost point on the carcass reinforcement and the radially innermost point on the same carcass reinforcement (this radial distance here being equal to 140 mm).

In this instance, the distance Y1 separating the radially outermost end of the first portion 41 of the second connecting reinforcement 40 from the point A of the reinforcing structure of the anchoring structure that is radially innermost is equal to 50 mm, namely 35% of the radial distance between the radially outermost point on the carcass reinforcement and the radially innermost point on the same carcass reinforcement.

The contact length V1 of the first portion 41 of the second connecting reinforcement 40 is equal to 16 mm, namely 32% of the distance Y1 (in this instance Y1=50 mm) separating the radially outermost end D1 of the internal portion 41 of the second connecting reinforcement 40 from the point A on the circumferential reinforcement armature 21 of the anchoring structure that is radially innermost.

The contact length V2 of the external portion 42 of the second connecting reinforcement 40 is equal to 12 mm, namely 19% of the distance Y2 (in this instance Y2=63 mm) separating the radially outermost end D2 of the external portion 42 of the second connecting reinforcement 40 from the point A on the circumferential reinforcement armature 21 of the anchoring structure that is radially innermost.

FIG. 2 shows an alternative form of tire bead according to the invention in which profiles 71, 72 made of rubber compound are inserted between the carcass reinforcement and the ends of the first and second portions 41, 42 of the second connecting reinforcement 40 so as to reduce the shear stresses near the said ends. The decoupling lengths, W1 and W2, respectively, are preferably greater than 5 mm.

FIG. 3 shows another alternative form in which the first portion 41 of the second connecting reinforcement 40 extends radially beyond the second portion 42 of the same reinforcement. In this alternative form, the volume of the profile 60 radially on the outside of the coating profile is very appreciably reduced so as to create strong mechanical coupling between the carcass reinforcement and the second connecting reinforcement.

In this alternative form shown in FIG. 3, the second connecting reinforcement 40 is formed of a first portion 41 and of a second portion 42, the said portions 41 and 42 being partially radially superposed inside the coating profile of the anchoring structure and axially inside the end point C of the carcass 10.

In the case shown, the meridian length Lc of the region of superposition of the first and second portions is at least equal to half the axial distance between the axially remotest points N1 and N2 of the anchoring structure 20. In this instance, the distance between the axially remotest points N1, N2 of the anchoring structure is equal to 20 mm, while the length of the region of superposition is equal to 10 mm. The points N1 and N2 are determined respectively by constructing tangents to the coating profile 22, the said tangents being perpendicular to the axis of rotation XX'.

This alternative form is attractive because it makes it possible to differentiate the materials of the first and second portions either by using reinforcing members of different natures (for example a textile reinforcing member for the second portion and a metallic reinforcing member for the first portion) or by using different coating materials or, yet again, by using a combination of the two aforementioned means. It also allows for improved manufacture through greater precision in the position of the components and reinforcements and through a reduction in bulk at the manufacturing stations.

FIG. 4 shows another alternative form of tire in which the first connecting reinforcement 30 is positioned not between the carcass reinforcement 10 and the second connecting reinforcement 40 but now between the anchoring structure 20 in the bead 5 and the carcass reinforcement 10. In this alternative form, the reinforcement armature of the anchoring structure is a bead wire 21 of substantially circular cross section (a bead wire of the braided type, that is to say which is formed by helical winding of several wires about a circular core). This bead wire 21 is surrounded by a rubber profile 22 which is obtained by winding a rubber compound of almost constant thickness around the bead wire. The exterior contour of the coating profile 22 when viewed in meridian section is therefore substantially circular.

A first connecting reinforcement 30 is wound over practically an entire turn of this anchoring structure 20; this first reinforcement 30 is extended radially outwards by a reinforcing part 31 situated axially between the carcass reinforcement 10 and the profile 60 of substantially triangular cross section, this profile serving to decouple the carcass reinforcement 10 from the part 42 axially on the outside of the second connecting reinforcement 40. The end point P2 of the connecting reinforcement 30 lies on the contour of the anchoring structure 20 very close to the point of tangency between the reinforcing part 31 and the said anchoring structure. As in the previous alternative form shown in FIG. 3, the second connecting reinforcement 40 is made up of two independent parts 41 and 42, these independent parts overlapping over a length Lc in a region substantially radially and axially on the inside of the anchoring structure 20.

Furthermore, in this alternative form, the carcass reinforcement is, at its ends, positioned between the first and second connecting reinforcements. This arrangement provides a more effective mechanical bond between the carcass reinforcement and each bead and prevents the reinforcing members of this reinforcement from coming into contact with the bead wire 21 while the tire is in use.

The invention claimed is:

1. A heavy goods vehicle tire comprising:
    a tread extended transversely on each side by sidewalls ending in beads intended to collaborate with a mounting rim;
    a radial carcass reinforcement comprising a plurality of reinforcing members directed in a direction that makes an angle of at least 80 degrees with the circumferential direction;
    said carcass reinforcement being anchored in each of the beads to an anchoring structure, said anchoring structure comprising a circumferential reinforcement armature around which is formed a coating profile of which the contour of the meridian section comprises a part radially on the inside and a part radially on the outside, said parts meeting at the points N1, N2 axially furthest from the contour of said coating profile;
    said carcass reinforcement being partially wound around the coating profile of the anchoring structure passing from the inside of the tire towards the outside, end C of this carcass reinforcement being located on or near the contour of the coating profile;
    a first connecting reinforcement, formed of a plurality of reinforcing members directed in a direction that makes an angle of 70 degrees or more with the circumferential direction, comprises a first part in contact with the carcass reinforcement between an end P1 radially on the outside of an end N3 of the contour of the coating profile of the radially outermost anchoring structure and the end C of the carcass reinforcement, said first connecting reinforcement~being extended beyond the end C of the carcass reinforcement by a second part in contact with the coating profile as far as an end P2 situated on the radially outside part of the contour of the coating profile;
    a second connecting reinforcement enveloping the first connecting reinforcement and passing radially under the coating profile radially on the inside of said first connecting reinforcement so as to form an internal portion and an external portion, the internal portion being axially on the inside of the carcass reinforcement and the external portion being axially on the outside of the said carcass reinforcement;
    the internal portion being in contact over a length V1 with the carcass reinforcement between a first end D1 of said first portion and the end P1 of the first connecting reinforcement, the external portion being in contact with the carcass reinforcement from a point D20 as far as an end D2 of the external portion over a length V2, the ends D1 and D2 being situated radially beyond the ends P1,P2 of the first connecting reinforcement;
    said second connecting reinforcement being formed of a plurality of reinforcing members directed in a mean direction that makes an angle of 50 degrees at most with the circumferential direction.

2. The tire according to claim 1, wherein the second connecting reinforcement is formed of a plurality of reinforcing members that make an angle of at least 20 degrees and at most 30 degrees with the circumferential direction.

3. The tire according to claim 1, wherein the end C of the carcass reinforcement is situated radially inside of the inner part of the coating profile of the anchoring structure and axially between the axially most remote points N1, N2 of the contour of the said coating profile.

4. The tire according to claim 1, wherein the contact length V2 of the external portion of the second connecting reinforcement is at least equal to 15 per cent of the distance Y2 separating the radially outermost end D2 of the external portion of the second connecting reinforcement from the point A of the circumferential reinforcement armature of the anchoring structure that is radially innermost.

5. The tire according to claim 1, wherein the contact length V1 of the first portion of the second connecting reinforcement is equal to at least 20 per cent of the distance Y1 separating the radially outermost end D1 of the internal portion of the second connecting reinforcement from the point A of the circumferential reinforcement armature of the anchoring structure that is radially innermost.

6. The tire according to claim 1, wherein the distance Y2 separating the radially outermost end of the external portion of the second connecting reinforcement from the point A of the reinforcing structure of the circumferential reinforcement armature that is radially innermost is equal to at least 20 per cent and at most 60 per cent of the radial distance between the radially outermost point on the carcass reinforcement and the radially innermost point on the same carcass reinforcement.

7. The tire according to claim 1, wherein the distance Y1 separating the radially outermost end of the first portion of the second connecting reinforcement from the point A of the reinforcing structure of the anchoring structure that is radially innermost is equal to at least 15 per cent and at most 40 per cent of the radial distance between the radially outermost point on the carcass reinforcement and the radially innermost point on the same carcass reinforcement.

8. The tire according to claim 1, wherein the reinforcing members in the first and second connecting reinforcements are identical and chosen from reinforcing members of textile or metallic nature.

9. The tire according to claim 1, wherein the portions of the second connecting reinforcement are locally decoupled from the carcass reinforcement in such a way as to reduce the shear stresses near said ends D1 and D2 of the second connecting reinforcement, an elastomeric material being inserted between said reinforcements.

10. The tire according to claim 1, wherein the second connecting reinforcement is formed of two discontinuous parts each constituting one of the portions these discontinuous parts overlapping in a region of superposition.

11. The tire according to claim 10, wherein the region of superposition is situated near the coating profile of the anchoring structure and the meridian length Lc of the region of superposition is at least equal to half the axial distance between the axially remotest points of the anchoring structure.

12. The tire according to claim 1, wherein the first connecting reinforcement is inserted between the coating profile of the bead anchoring structure and the carcass reinforcement.

* * * * *